United States Patent [19]
Ruttenberg

[11] Patent Number: 5,491,823
[45] Date of Patent: Feb. 13, 1996

[54] LOOP SCHEDULER

[75] Inventor: John C. Ruttenberg, Waban, Mass.

[73] Assignee: Silicon Graphics, Inc., Mountain View, Calif.

[21] Appl. No.: 186,268

[22] Filed: Jan. 25, 1994

[51] Int. Cl.$^6$ ..................................................... G06F 9/45
[52] U.S. Cl. .................... 395/700; 364/DIG. 1; 364/280.5
[58] Field of Search ..................................... 395/650, 700

[56] References Cited

U.S. PATENT DOCUMENTS

| | | | |
|---|---|---|---|
| 4,782,444 | 11/1988 | Munshi et al. | 364/DIG. 1 |
| 5,367,651 | 11/1994 | Smith et al. | 395/700 |
| 5,386,562 | 1/1995 | Jain et al. | 395/650 |

OTHER PUBLICATIONS

Lam, Monica, "Software Pipelining: An Effective Scheduling Technique for VLIW Machines", Department of Computer Science, Carnegie Mellon University, Proceedings of the SIGPLAN '88 Conference on Programming Language Design and Implementation, Atlanta, Georgia, Jun. 22–24, 1988, pp. 318–328.
Lam, Monica Sin–Ling, "A Systolic Array Optimizing Compiler", Computer Science Department, Carnegie Mellon University, May 1987, pp. 1–138.
Aho, Alfred V., Ravi Sethi and Jeffery D. Ullman, *Compliers Principles, Techniques, and Tools*, Bell Telephone Laboratories, Incorporated, 1986, pp. 513–519, 585–722.
James C. Dehnert et al., "Compiling for the Cydra 5", *The Journal of Supercomputing*, 7, pp. 181–227 (1993).

*Primary Examiner*—Thomas M. Heckler
*Attorney, Agent, or Firm*—Sterne, Kessler, Goldstein & Fox

[57] ABSTRACT

A loop scheduler in a software compiler system for generating a schedule for executing in a target computer loops of instructions contained in a computer program is described. The loop scheduler operates by searching for an optimal loop schedule for executing a particular instruction loop in the target computer. The loop scheduler then identifies loop overhead instructions and non-loop overhead instructions in the particular instruction loop. A replicated loop schedule is generated by the loop scheduler by replicating the non-loop overhead instructions in the loop schedule by a replication factor such that overlap of each operation instance in the optimal loop schedule with itself is prevented. The loop scheduler inserts the loop overhead instructions into the replicated loop schedule to generate a modified loop schedule, and then allocates registers of the target computer to the modified loop schedule.

16 Claims, 7 Drawing Sheets

FIG. 8

| | | | |
|---|---|---|---|
| 0: | A(i) = t2{0} | t2 = t1*C {4} | t1 = A(i+8) {8} |
| 1: | A(i+1) = t2{1} | t2 = t1*C {5} | t1 = A(i+9) {9} |
| 2: | A(i+2) = t2{2} | t2 = t1*C {6} | t1 = A(i+10) {10} |
| 3: | A(i+3) = t2{3} | t2 = t1*C {7} | t1 = A(i+11) {11} |
| 4: | if (i>n) break | i = i + 4 | |

FIG. 9

```
FUNCTION Loop_Schedule {
   Mem_Reference_Analysis;
   Build_Graph;
   Loop_Overhead_Set_Aside;
   Find_Components;

IF (max_component_size>component_size_limit) {
      Ad_Hoc_Path_Length_Reduction;
      IF (max_component_size>component_size_limit)
         RETURN FAILURE;
   }
   Component_Path_Lengths;
   Code_Transformations;     //Must maintain or recalculate path lengths FOR ii=Max(min_recurrence_ii,min_resource_ii) TO ii_limit DO {
      LOOP
      FOR EACH schedule FOUND AT ii
      FOR schedules_found_count = 1 TO schedules_found_count_limit
      DO {
         Local_Lifetime_Optimization;
         Determine_Replication_Factor;
         IF (replication_factor > 0 )
            Replicate_Loop (replication_factor);
         Loop_Overhead_Accounting;

IF (Allocate_Registers (schedule)) {
            Generate_Wind_Up_Down (schedule);
            conditioning_factor = replication_factor X unroll_factor;
            Generate_Pre_Post_Conditioning (conditioning_factor);
            RETURN < pre_conditioning,
                     wind_up,
                     schedule,
                     wind_down,
                     post_conditioning > ;
         }
      } //Search for a schedule at ii
   }   //Search for a schedule at any ii
   RETURN FAILURE;
}
```

LOOP SCHEDULER

A portion of the disclosure of this patent application contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The present invention relates generally to a software compiler system, and more particularly to a loop scheduler within a software compiler system.

2. Related Art

A compiler includes a loop scheduler to schedule instruction loops for execution. Ideally, a loop scheduler exploits the parallelism between loop iterations to generate tight code that takes advantage of instruction level parallelism.

A conventional loop scheduler is implemented such that it packs a loop into a small number of instructions. The sequence of instructions is called a schedule, and its length is called the iteration interval (II) of the schedule. According to this conventional approach, the loop scheduler schedules code such that one iteration of the loop is performed per execution of the schedule. For a typical loop, the schedule might begin with load instructions, have a middle section composed of arithmetic instructions, and a final section containing store instructions.

This type of schedule has an iteration interval which is at least as great as the length of the longest path through the data precedence graph (DPG) of the loop and only exploits parallelism from within a single iteration of the loop. As will be appreciated, this conventional approach does not make very good use of instruction level parallelism.

Thus, what is required is an improved loop scheduler that exploits the parallelism between loop iterations to generate tight code that takes advantage of instruction level parallelism.

SUMMARY OF THE INVENTION

The present invention is directed to a loop scheduler in a software compiler system for generating a schedule for executing in a target computer loops of instructions contained in a computer program.

The loop scheduler operates by searching for an optimal loop schedule for executing a particular instruction loop in the target computer. The loop scheduler then identifies loop overhead instructions and non-loop overhead instructions in the particular instruction loop.

A replicated loop schedule is generated by the loop scheduler by replicating the non-loop overhead instructions in the loop schedule by a replication factor such that overlap of each operation instance in the optimal loop schedule with itself is prevented. The loop scheduler inserts the loop overhead instructions into the replicated loop schedule to generate a modified loop schedule, and then allocates registers of the target computer to the modified loop schedule.

The loop scheduler searches for the optimal loop schedule by enumerating all possible schedules of the particular instruction loop using a predetermined exponential search procedure, ordering the all possible schedules in a search list according to complexity of operation scheduling, and pruning the predetermined exponential search procedure to expedite back searching in the search list.

The loop scheduler identifies loop overhead instructions and non-loop overhead instructions by classifying an instruction of the particular instruction loop as a loop overhead instruction if the instruction operates to increment an induction variable, and by classifying the instruction as a loop overhead instruction if the instruction operates to perform a logical test of an induction variable.

The replication factor is generated by determining a total number of instructions value corresponding to the number of instructions in the particular instruction loop, determining a lifetime of each operation instance in the optimal loop schedule, and generating a set of potential replication factors, each element of the set being equal to a lifetime value for an operation instance divided by the total number of instructions value. The replication factor is then set equal to a maximum value in the set.

The loop scheduler inserts the loop overhead instructions into the replicated loop schedule by using loop overhead information and an iteration number of a memory reference operation in the optimal loop schedule to calculate effective address information of the memory reference operation, generating first scheduling information pertaining to scheduling operations of the particular instruction loop which operate to increment induction variables, and generating second scheduling information pertaining to scheduling operations of the particular instruction loop which operate to exit conditional loops. The effective address information, the first scheduling information, and the second scheduling information are then inserted into the replicated loop schedule.

The loop scheduler allocates registers of the target computer to the modified loop schedule by calculating an applicable executable range of clock cycles for an operation instance of the modified loop schedule according to any scheduled data predecessors and any scheduled data successors of the operation instance, performing a forward search of the modified loop schedule to schedule any unscheduled data predecessors of the operation instance, and performing a backward search of the modified loop schedule to schedule any unscheduled data successors of the operation instance.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein:

FIGS. 4–8 illustrate example schedules of instruction loops used to illustrate features of the present invention;

FIG. 9 illustrates pseudo-code representing the overall control structure of the software compiler system according to a preferred embodiment of the present invention.

DETAILED DESCRIPTION OF THE PREFERRED EMBODIMENTS

1. Overview of the Present Invention

This section provides an overview of the present invention.

1.1 Environment

Figure 1:
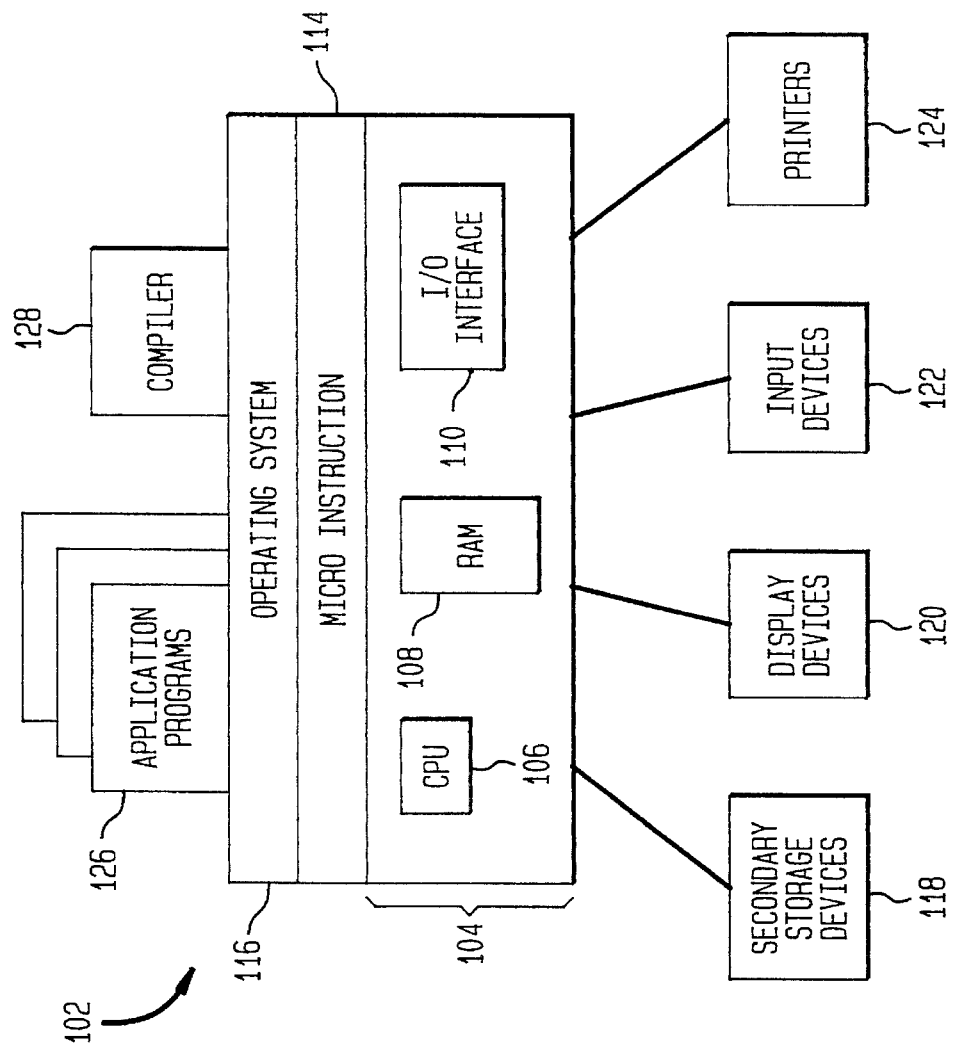
FIG. 1 is a block diagram of a computer platform on which a software compiler system of the present invention preferably operates.

FIG. 1 is a block diagram of a computer platform 102 in which a software compiler system 128 of the present invention preferably operates. Alternatively, the present invention includes the software compiler system 128 in combination with the computer platform 102.

The computer platform 102 includes hardware units 104 including one or more central processing units (CPU) 106, a random access memory (RAM) 108, and an input/output (I/O) interface 110. The computer platform 102 also includes an operating system 116, and may include microinstruction code 114. Various peripheral components are connected to the computer platform 102, such as secondary storage devices 118 (such as a hard drive), display devices 120 (such as a monitor), input devices 122 (such as a keyboard and/or a mouse), and printers 124.

A number of application programs 126 operate on the computer platform 102, including the software compiler 128 of the present invention. The application programs 126 and the software compiler 128 may operate sequentially on the computer platform 102, but preferably operate in parallel on the computer platform 102.

The application programs 126, including the software compiler 128, include instructions which, when executed in the computer platform 102, enable the computer platform 102 to perform particular functions. The software compiler 128 is described in detail below. The application programs 126 do not form a part of the present invention, and therefore will not be described further.

In a preferred embodiment of the present invention, the computer platform 102 is the Power Challenge computer system manufactured by Silicon Graphics Inc. of Mountain View, Calif. The operating system 116 is preferably the IRIX operating system manufactured by Silicon Graphics Inc. of Mountain View, Calif. The software compiler 128 is preferably written in the C computer programming language.

1.2 Software Compiler System

Figure 2:
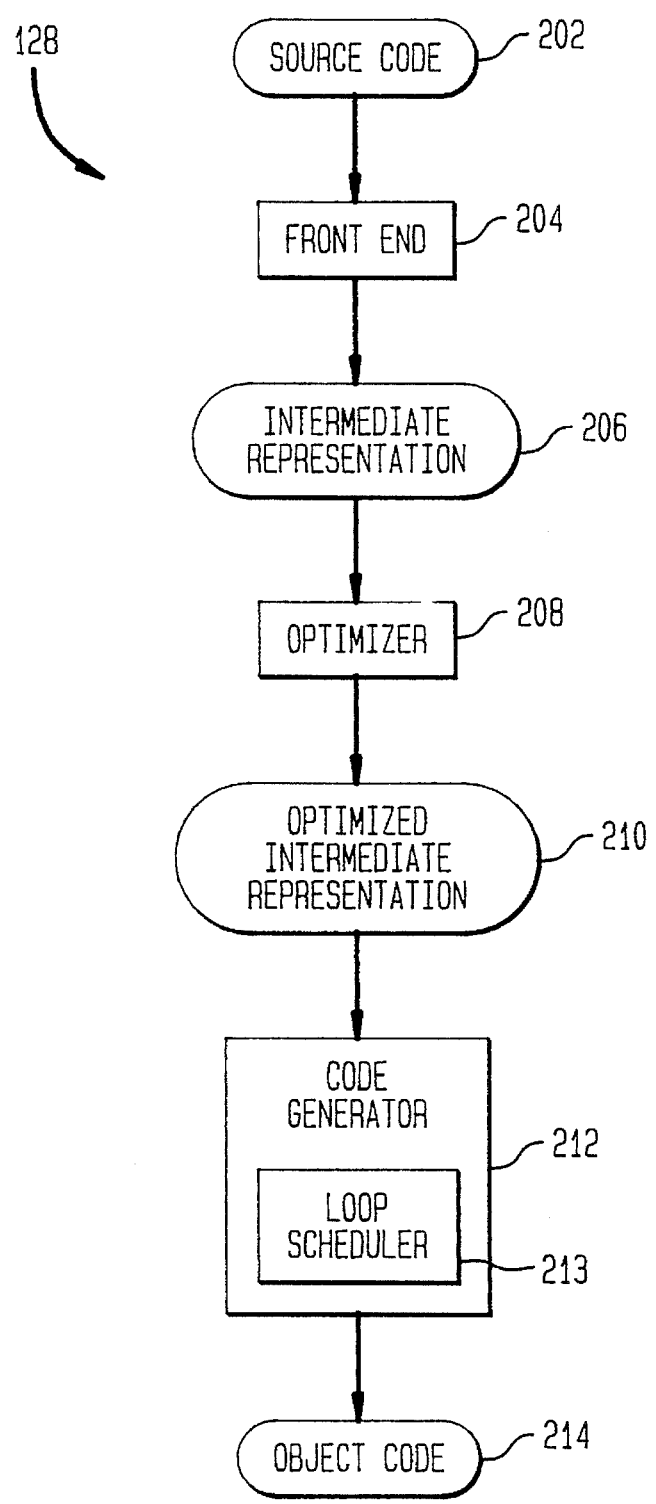
FIG. 2 is a block diagram of a Software compiler system according to a preferred embodiment of the present invention.

As shown in FIG. 2, the software compiler 128 of the present invention preferably includes a front end portion (also called the front end) 204, an optimizer portion (also called the optimizer) 208, and a code generator portion (also called the code generator) 212. The operation of the software compiler 128 shall now be generally described.

The front end 204 receives as input source code 202 (which may be stored in the RAM 108 and/or the secondary storage devices 118) and generates an intermediate representation (IR) 206 of the source code 202. The optimizer 208 optimizes the IR 206 to produce an optimized intermediate representation (IR) 210. The code generator 212 generates object code 214 (which may be stored in the RAM 108 and/or the secondary storage devices 118) from the optimized IR 210. The object code 214 (after linking by a linker, not shown) may be executed in a target machine (not shown).

The front end 204, the optimizer 208, and the code generator 212 are generally well known and are described in many publicly available documents, such as *Compilers: Principles, Techniques, and Tools* by Alfred V. Aho, Ravi Sethi, and Jeffrey D. Ullman (Addison-Wesley Publishing Company, Reading, Mass., March 1988), which is herein incorporated by reference in its entirety.

The code generator 212 preferably includes a loop scheduler 213 which schedules for execution loops of instructions contained in the optimized IR 210. It should be noted, however, that the placement of the loop scheduler 213 in the code generator 212 is not critical. For example, the loop scheduler 213 could alternatively be part of the optimizer 208.

According to the present invention, the goal of the loop scheduler 213 is to exploit the parallelism between loop iterations to generate tight code that takes advantage of instruction level parallelism. The loop scheduler 213 employs a technique called modulo scheduling to perform this function. The loop scheduler 213 also employs novel and/or improved procedures for processing loop overhead, for allocating registers, and for schedule searching. The parallel code that the loop scheduler 213 generates is said to be software pipelined (this software pipelined, parallel code forms a portion of the object code 214).

In performing its function, the loop scheduler 213 must ensure that data precedence is preserved. For example, the load from a given iteration must still precede the calculation from that iteration. The manner in which the loop scheduler 213 performs its function while maintaining data precedence shall now be generally described with reference to FIGS. 3 and 4.

Figure 3:
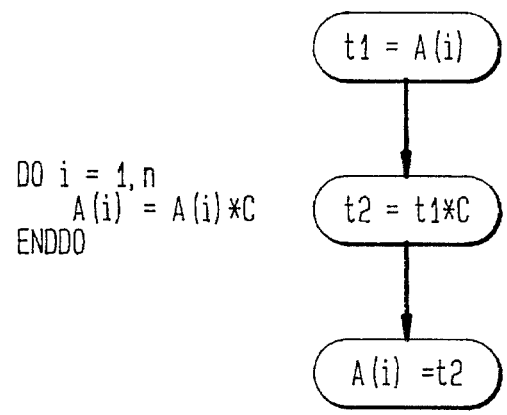
FIG. 3 is an example data dependency graph used to illustrate features of the present invention.

FIG. 3 shows a simple DO loop along with its data precedence graph. Assume that all the operations in this loop (loads, stores, multiplies) have one cycle latencies. Then, the length of the best schedule that contains only operations from a single loop iteration is three, and this schedule performs only a single loop operation every cycle.

Figure 4:
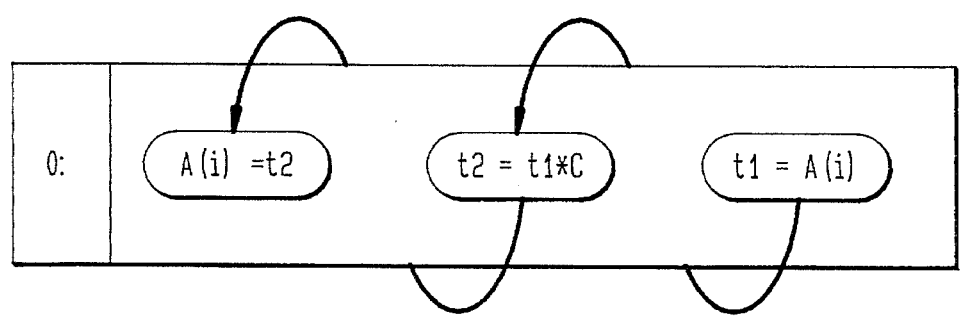

FIG. 4 illustrates a schedule of the DO loop of FIG. 3 that has been generated by the scheduler 213 according to the present invention. In the schedule of FIG. 4, the operations from vector scale have been packed into a single clock cycle. FIG. 4 also shows the data precedence edges. Even though the operations execute in parallel, these edges must still be obeyed. In order for this to be true, each iteration of the schedule must execute operations from three loop iterations. For example, when the schedule executes a load from loop iteration i, it must execute a multiply from iteration i-1 and a store from iteration i-2.

Figure 5:
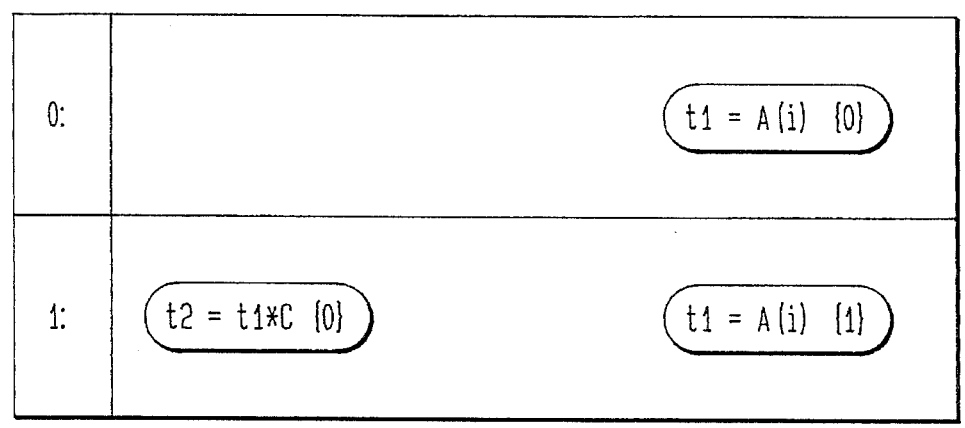

The scheduler 213 generates this type of schedule by executing a loop wind-up function that offsets the number of executions of the operations in the loop relative to one another. In the example shown in FIGS. 3 and 4, the loop wind-up function ensures that the load operation executes twice and the multiply operation executes once before the loop begins to execute. Then, the $i^{th}$ execution of the loop schedule will execute the load for the $i+2^{th}$ time, the multiply for the $i+1t^{th}$ time, and the store for the $i^{th}$ time. FIG. 5 shows the loop wind-up for the example of FIGS. 3 and 4. The numbers in the curly braces indicate how many times the given operation has already executed.

. Thus, the loop scheduler 213 of the present invention preferably packs a loop into fewer cycles than the length of the critical path through the DPG of the loop by executing operations from different loop iterations within the same iteration of the schedule. The loop scheduler 213 essentially winds the DPG graphs around from the top to the bottom of the schedule. The loop scheduler 213 ensures that operations related by data precedence edges that cross from the top to the bottom of the schedule execute in different loop iterations within a given schedule iteration. Each time an edge makes such a crossing it results in a difference of a single loop iteration between the related operations.

1.3 Definitions

Before proceeding further with the description of the present invention, it will be useful to provide definitions for various terms that are used herein.

1.3.1 Operations and Schedules

An "operation" is an intermediate code RISC (reduced instruction set computer) level statement, one of the nodes in the DPG (data precedence graph). A "loop schedule" (or "schedule") is a sequence of hardware instructions that executes repeatedly in order to execute successive iterations of the loop. The length of a schedule is called the iteration interval (II).

Within a schedule, a group of instructions that are expected to execute in a parallel is called a "cycle". Cycles are numbered in a schedule from 0 to II-1. Successive executions of the loop are called "loop trips" and successive executions of the loop schedule are called "schedule trips". Thus, reference is often made to the $i^{th}$ loop trip or schedule trip.

Successive executions of each of the operations in the loop are named and are called "operation executions". The "operation execution number" of an operation execution is the number of times the operation has been executed before the given execution. A given operation execution takes place at a given time relative to the execution time the first operation in the loop is executed. Time relative to the start of execution of the loop is measured in "clocks". In a single clock, a group of instructions (presumably a cycle) are executed in parallel. The "clock time" of a given operation execution is the count of clocks between it and the clock time of start of the loop.

Each operation in a DPG results in one or more "operations instances" (OIs) in the final code. In the vector scale example of FIG. 5, the load operation ended up having three instances: two in the loop wind-up as well as one in the loop schedule. As discussed further below, further operation instances may be the result of unrolling, of pre- or post-conditioning, or of a loop wind-down.

A particular execution of an OI corresponds to a particular execution number of its corresponding operation. The number of times the operation has already been executed by all its OIs before the given execution is its operation execution number.

The relationship of the executions of the operations corresponding to the OIs in the loop schedule are often discussed herein. This was already discussed, for example, where it was noted that the load must execute two more times than the store. To facilitate this, the term "relative execution number" (REN) is used. The REN of an OI in a loop schedule is the operation execution number of the OI on the first ($0^{th}$) trip of the loop. Since OIs in loop wind-ups only execute once, their RENs are just the operation execution numbers of their operations on their only execution. OIs in a loop wind-down have RENs defined in terms of the RENs of the OIs in the loop schedule. Suppose that the final OI of an operation (O) in the schedule has a REN of i, then the first OI in the wind-down has a REN of i+1, etc. Another way to say this is that the RENs of the OIs in the loop wind-down are their execution numbers when the schedule trips exactly once. OI {i} is used to indicate that OI has a REN of i.

Since each OI has a REN that is unique among all the RENs of the given operation, the OI can be named by its operation and its REN. O {i} is used to refer to the OI of operation (O) with REN=i. Note the correspondence between this definition and the existence of the curly braces in FIG. 5.

Conditionals within a loop might seem to complicate this terminology. However, O {i} means what the operation O did on the $i^{th}$ trip of the loop no matter how many times O has actually executed.

Returning to the example of FIGS. 3–5, the DO loop results in a one cycle schedule containing the following OIs:

t1=A(i) {2} t2=t1 * C {1}

A(i)=t2 {0}

1.3.2 Data Precedence

Further definitions shall now be provided pertaining to data precedence. Data precedence is complicated in the context of the present invention by the fact that the loop scheduler 213 deals with data precedence between iterations as well as within a single iteration. In order to accomplish this, data precedence relations are defined between operations in terms of the data precedence relations between their executions.

The simplest kind of data precedence is operand-reader data precedence. This is the relation that a operand execution has to its scalar operands. O(a,b) is used to indicate that a is an operand of b. Sometimes it is important to distinguish the order of the operands. $O_i(a,b)$ is used to indicate that a is the $i^{th}$ operand of b.

Operand-reader data precedence is a subset of general data precedence. P(a,b) is used to indicate that the clock time of a is constrained relative to that of b. Note that O(a,b) implies that P(a,b). Operand data precedence will be very important in the following discussion of register allocation, while general data precedence is sufficient for the following discussion of modulo scheduling.

Not all data precedence edges are the same since they may have different delays. The most obvious reason for a delay is to quantify operand-reader edges according to the latency of a particular hardware instruction. D(a,b)=n is used to indicate the number of clocks by which execution of a must follow execution of b. This quantity is only defined if P(a,b).

Delays of 0 and negative delays are allowed. If D(a,b)=0, then b must execute no earlier than the clock in which a executes. If D(a,b)=−3, b must execute no earlier than 3 clocks before a executes.

Since data precedence has been defined as a relation on operation execution instead of operations themselves, the related objects could be from different or identical loop iterations. However, it is still necessary to represent data precedence relations primarily as edges between operations that describe restrictions on the relative clocks of the executions of the operations. IP(O,P)=k is used to indicate that the clock time of the $i^{th}$ execution of P is constrained relative to the clock time of the i-$k^{th}$ execution of O. ID(O,P,k)=d is used to indicate that the $i^{th}$ execution of O must take place d clocks before the i+$k^{th}$ execution of P. Each edge in the DPG may be viewed as a four-tupple: <O,P,k,d>; the edge exists if and only if ID(O,P,k)=d. "k" is called the iteration difference of the edge, d is its delay and the pair <k,d> is its cost.

1.4 Rule Underlining Software Pipelining According to the Present Invention

Presented in this section, using the definitions provided above, is a rule which underlines software pipelining according to the present invention. This rule is called the fundamental law of software pipelining (FLSP). Let:

$co=C(o\{i\})$ $cp=C(p\{j\})$ $ID(o,p,k)=d$

Then the fundamental law of software pipelining is as follows:

$(j * II+cp)-(i * II+co)>=d-(II * k)$

As long as a schedule obeys the FLSP, all data precedence constraints will be satisfied.

1.5 Establishing a Schedule

In order to make a software pipelined schedule obey the FLSP, the loop scheduler 213 sets up the loop schedule so that each execution of the schedule executes different iterations of the various operations in the loop. The present invention defines a loop windup that offsets the RENs of the scheduled operations of the loop. The loop wind-up is preferably derived from the loop schedule.

In particular, for each operation O in a loop, it will be necessary to execute the operation O k times in the loop wind-up. k is the minimal REN of any OI derived from the operation O in the schedule. Thus, the loop wind-up is generated by repeatedly replicating the loop schedule, each time determining the RENs of the OIs in the loop and omitting any OI whose RENs have become negative. An example loop wind-up is presented in FIG. 5.

2. Modulo Scheduling

The manner in which the loop scheduler 213 generates a software pipelined schedule for a loop shall now be described. As noted above, the loop scheduler 213 performs this function using a technique called modulo scheduling.

If there are no cycles in the DPG of the loop, then any packing of the operations of the loop into a schedule that obeys the resource rules of the target machine can be made into a legal software pipelining. All that is required is to assign RENs to the OIs so that they obey the FLSP. This can be done with a depth first walk of the DPG.

If the target machine has a simple resource model, a minimal schedule that obeys the resource rules of the target machine can be obtained in a relatively simple manner. The required simplicity is that only resources in the cycle of an instruction's issue need be considered and that the resource requirements of different operations within the same cycle not interact in complex ways. When this is true, it is necessary to only count the total number of resources of each type used by the operations in the loop and divide by the number available in each cycle. The minimal length schedule contains as many cycles as the most often requested resource class divided by the number of resources of that class available in each cycle. Once the minimal sized schedule is calculated, the operations can be packed into the schedule in near linear time.

However, the simple case described above does not usually apply because it is often necessary to process code containing data precedence cycles. Also, in most cases the target machine will have resource constraints that extend beyond the cycle of an instruction's issue. Also, it is often necessary to contend with a relatively small number of registers and a register interlock scheme seemingly incompatible with the simple view of software pipelining presented above. Loops with conditional branches offer additional complexities. These complexities and the manner in which the loop scheduler 213 deals with these complexities are discussed in the following sections.

2.1 Data Precedence Cycles

Data precedence cycles (also called recurrences) imply that not just any packing of operations into a schedule can be made to obey the FLSP. Note that an "iteration difference of a path" in a DPG is defined to be the sum of the iteration differences of the edges in the path. The "delay of a path" is the sum of the delays of the edges in the path.

If the cost of the recurrence is <k,d>, then each operation in the path may execute no more often than k/d clocks. This in turn implies that II must be at least k/d cycles, since each OI will be re-executed every II cycles.

MRII (minimum recurrence II) is defined as the maximal k/d of any recurrence in the DPG. It forms a lower bound on the II of a legal loop schedule for the loop. Finding this MRII can be computationally very expensive, depending on the properties of the DPG. This is described further below.

Also, unlike code with more simple DPGs, maximizing throughput for loops with multinode recurrences is NP-hard (where NP stands for non-deterministic polynomial). In fact only an exponential algorithm can determine the least II at which such a schedule exists.

To cope with this complexity, the loop scheduler 213 of the present invention uses a heuristic to implement modulo scheduling. There are various heuristics that can be used. According to one heuristic, strongly connected components are scheduled separately. Then, an attempt is made to combine them using techniques that are conventionally used with acyclic graphs. This approach is advantageous because it will find a certain class of simple minimal schedules. For example, suppose that all the multinode recurrences have the same d/k and that there is a schedule at a given II. For a simple resource model, this algorithm will find the schedule.

Another heuristic involves a backtracking search of the possible schedules with severe heuristic pruning. This search is described in Dehnert, J. C. and Towle, R. A., "Compiling for the Cydra 5," *J. Supercomputing* 7(½):181–227 (1993), which is herein incorporated by reference in its entirety.

2.2 Searching Heuristics

The section describes a procedure for searching for a schedule according to a preferred embodiment of the present invention.

2.2.1 Complexity of the Problem

In the face of recurrences or complex resource restrictions, the search for a packing that can be converted into a software pipelined schedule is non-trivial. In fact, even without data precedence constraints, optimal packing of instructions into clocks is equivalent to the famous NP-complete problem, bin packing. Bin packing is NP-complete when there are blocks of size 1, 2, and 3. Similarly, packing into a schedule is NP-complete if there are three different operation types each of which uses the same resource for different numbers of clocks. At least one target computer of interest, the MIPS-R4000 computer, has just this property.

Many operations can be designed to avoid this property. On the other hand, cede that utilizes both unary and binary floating point (FP) operations cannot be packed with any known polynomial algorithm. FP divide operations, square-roots, integer multiplies also introduce scheduling complexity.

For loops with recurrences comprising more than one operation, data precedence constraints cannot be ignored. Otherwise, it may not be possible to make legal software pipelined schedules. The groups of operations in a multi-operation recurrence have an effect on scheduling very similar to that of operations with complex resource restrictions.

2.2.2 Exponential Backtracking Search

It is possible to enumerate all possible schedules by a fairly standard recursive search. This is an exponential algorithm and is not by itself practical. But it serves as a framework for the scheduling algorithm used by the present invention. In a following section, a procedure for pruning the search such that the search is made practical is discussed.

All possible schedules are enumerated by first picking an ordering op[0].. op[n-1]. This is called the "scheduling list" or "search list". The loop scheduler 213 enumerates all of the possible ways to assign II clocks to the operations in the scheduling list as a sequence of all the $II^n$ vectors of n integers $0<i<II-1$:

<0,0, ... ,0>

<0,0,. . . , 1>. . .

<II-1, II-1, . . . , II-1>

Not all of these "schedules" are legal, but all legal schedules are included somewhere in the list. This is the case, since all ordering of the operations are included.

2.2.3 Heuristics

As noted above, looking for schedules with an exponential search is not practical. But the effectiveness of the search is greatly improved according to the present invention by using two types of heuristics:

1. Order the search list so that operations that are more difficult to schedule are considered first.

2. Prune the search so that backtracks move forward faster through the enumeration of orderings.

These heuristics are discussed below.

2.2.4 Ordering the Search List

The inventor has determined that the effectiveness of scheduling is greatly impacted by the ordering of the search list. The loop scheduler 213 orders the search list such that operations with multicycle resource requirements come first on the list. The more difficult an operation's constraints are to satisfy, the earlier it appears on the list. Multicycle recurrences are treated like a single operation with a very complex resource requirement in that the members are contiguous in the list and occur in order of the sum or resource requirements in the entire list.

Ordering the list in this way avoids having to backtrack over operations that are irrelevant while trying to solve the hardest part of the scheduling problem.

2.2.5 Pruning the Search

The complete exponential search set out above is insensitive to the relevance of changes to success in scheduling. It just always advances each OP forward in the schedule by one cycle. The loop scheduler 213 prunes the search by noticing when it cannot find a resource-legal placement of an operation. The loop scheduler 213 uses that operation to prune the backtrack.

In particular, the loop scheduler 213 endeavors to find an earlier operation in the scheduling list whose resources are relevant to the failed OP. Actually, an operation whose resources are relevant but not identical to the failed OP is preferred, but it is also necessary to look at identical OPs. Hence, the loop scheduler 213 first looks backward in the scheduling list for the former. If one is found, then the loop scheduler 213 backtracks to that point. Otherwise, the loop scheduler 213 looks backward for any operation with relevant resource requirements. If one is found, the loop scheduler 213 backtracks to it. If neither exists, the loop scheduler 213 will have failed to find a schedule for this list at this II.

2.3 Latencies and Register Interlocks

The simple software pipelining model described above is incompatible with the pipelining model of most modern RISC computers. In the example of FIG. 3 unit cycle latencies were assumed. However, most target machines have multicycle latencies.

Most target architectures of interest also feature register interlocks in order to clarify the semantics of pipelining and allow for binary compatibility between hardware implementations with different pipeline latencies.

Pipeline interlocks ensure that each time a register is read, the resulting value is that of the most recently issued instruction that targeted the register no matter how recently that write was issued. If the latency of the writer is greater than the interval between its issue and that of the reader, a stall is taken and the machine waits until the pipeline actually produces its results.

Most target architectures of interest also differ from polycyclic architectures in that a single instruction can only target a single specific register. Each time the instruction is executed, that register is overwritten.

Taken together, these facts imply that an instruction cannot be re-executed until after its last reader has executed. To see why this is a problem, reconsider the example of FIG. 3, this time with realistic assumptions about latencies and interlocks. Suppose, for the sake of example, that both loads and floating multiplies have four cycle latencies and that we have the following schedule:

r1=A(i); r2=r1 * C; A(i)=r2

In this case, instead of the desired parallel execution, eight clocks of stall are incurred for each schedule trip.

The loop scheduler 213 solves this problem as follows. Essentially, the loop scheduler 213 replicates the loop schedule before register allocation. Each time the schedule is replicated, a new OI is created for each operation. Since each OI can read and write a different set of registers, rewriting each register is avoided until all its readers have executed.

Figure 6:
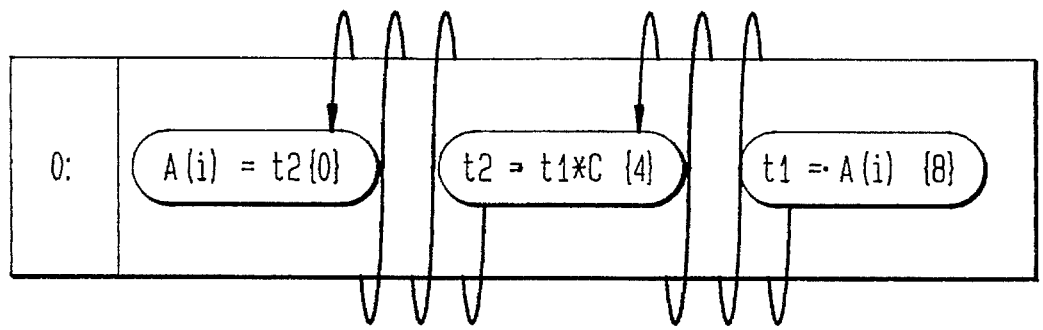

This can also be stated as follows. It is desired to prevent the life-time of any OI in the loop schedule from overlapping (and thus conflicting with) itself. Most target architectures of interest do not support this feature. For example, FIG. 6 shows a one cycle schedule for vector scale. The OIs are shown with RENs consistent with the longer latencies and the FLSP. In order for the load to transmit its result to the multiply, the lifetime of t1 must extend for at least four trips of the schedule (whether this is four or five actually depends on how the OIs are ordered in the cycle).

Figure 7:
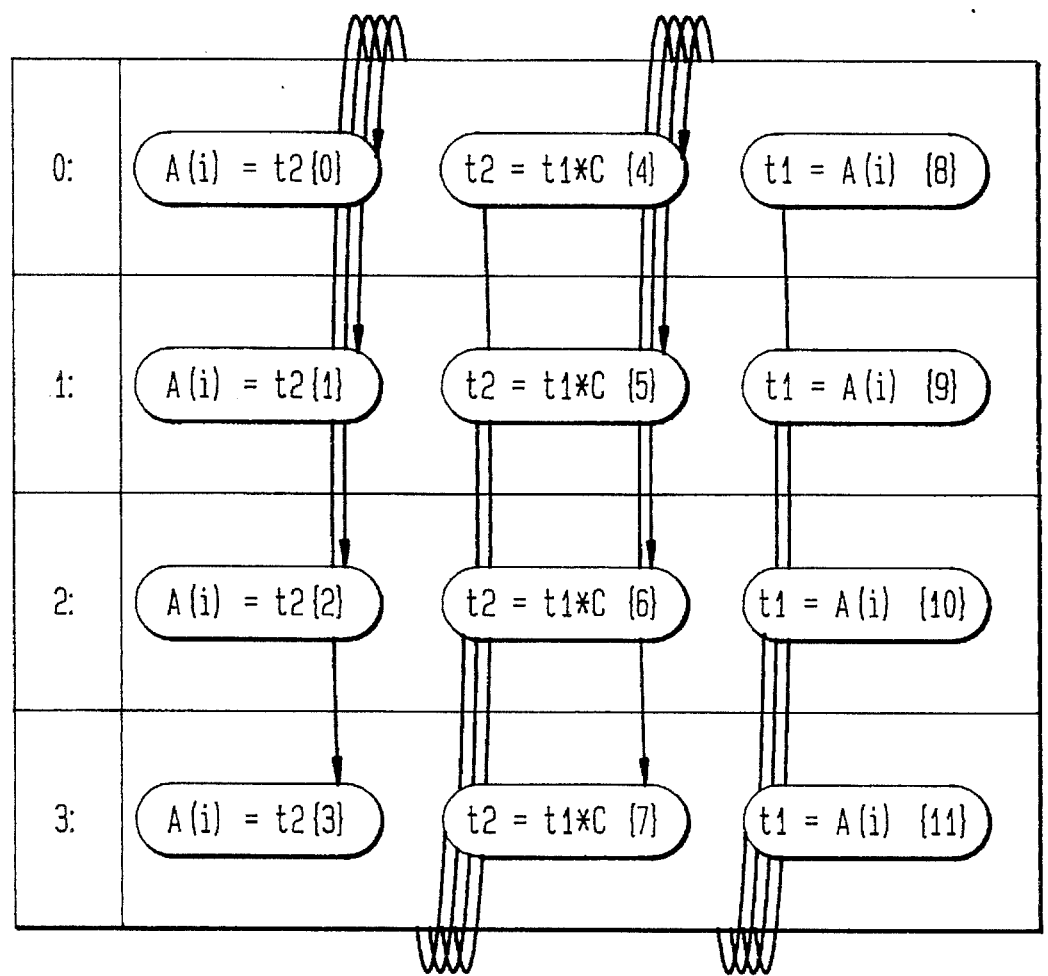

As shown in FIG. 7, by having the loop scheduler 213 replicate the schedule four times, the need for any register lifetime overlap is removed. Schedule replication is a simple process. The schedule is successively copied with the RENs of its OIs incremented one more time in each successive replication.

The only slight subtlety concerns the naming of the results of the replicated OIs. It is evident from the example in FIG. 7 that the value read as t1 in:

$$t2=t1 * C\{4\}$$

must be the same as the value written by:

$$t1=A(i)\{8\}$$

The rule for TN (temporary name; a TN preferably represents a compiler temporary variable) identity in a replicated schedule is that TNs t1 and t2 written in the loop are identical if and only if:

1. T1 and t2 are written by instances of the same operation, and
2. The REN of the OIs that write t1 and t2 are equal MOD (modulo) the replication factor. Calculating the minimum required replication factor is also fairly simple. Let $O_i\{j\}$ be the ith instruction (not cycle) in the schedule. The lifetime given in number of instructions of $O_i\{j\}$ is:

$$\text{Max } (l+1*II)-(i+j*II)$$

$P_k\{l\}$ such that $O(O_i\{j\}, P_k\{l\})$

Then the loop scheduler 213 must duplicate the schedule enough times so that no lifetime is greater than the number of instructions in the schedule. In other words, the minimum replication factor is:

$$\text{Max Ceiling(Lifetime(OI)/number of instructions)}$$

In the above, "Max" is the well known maximum operation (operating to select a maximum value from a set), and "Ceiling" is the well known round up operation (operating to round a value up to the next integer value).

2.4 Loop Overhead

The above examples have not considered branches from the bottom of a loop to the top, end tests, where induction variables are incremented, how address arithmetic is performed, etc. Preferably, the loop scheduler 213 sets these operations aside before scheduling and then accounts for them only after the schedule has been replicated.

All these operations belong to a class of operations called "loop overhead". With these operations, it is both possible and desirable to avoid duplicating them along with the loop schedule. In particular, it is not desirable to end up with an end test and a branch for each schedule replication as this would waste integer issue slots. Whether an induction variable update for each loop iteration can be afforded depends on whether we have auto-incrementing memory references and whether the loop is already bound by integer operations.

Fortunately, it is possible to give loop overhead operations special treatment so that they are not replicated along with the schedule. In the case of the loop exit branch, the loop is preconditioned so that it is known that it trips by an even multiple of the number of schedule replications. Memory references are handled as offsets from the induction variable. Instead of a reference followed by an increment followed by a reference, the second reference uses the increment as an offset from the induction variable. Then the induction variable increment need only occur once per every two memory references. That is, by twice its original increment.

Consider, for example, FIG. 8 which shows the schedule for vector scale after loop overhead accounting. FIG. 8 differs from FIG. 7 is three ways (that is, three things have happened to the schedule in FIG. 7):

1. The memory references now offset the induction variable i appropriately.
2. A conditional branch to the top of the loop has been added at the end of the schedule.
3. The induction variable i has been incremented by four in the delay slot of the branch.

After the schedule has been replicated, the loop scheduler 213 performs the following functions:

1. The loop scheduler 213 uses the loop overhead and the iteration number of each memory reference to calculate an effective address. If the replication factor is r, the induction variable increment function f, and the original effective address of an operation is IV+C, then the effective address of the $i^{th}$ iteration of the operation is $IV+f_i(C)$. This is quite simple if f is just the addition of a constant. When f is the addition of an arbitrary TN, it is necessary to either use autoincrements (and thus exclude the induction variable and its associate operations from the loop overhead) or set up registers containing 2TN, 3TN, ... rTN. However, this is possible only if TN is loop invariant.

2. The loop scheduler 213 schedules induction variable increments and conditional loop exits. It is desirable to do this in the holes of the schedule (autoincrementing memory references make this particularly effective). Note that using an autoincrementing memory reference for the last memory reference to an induction variable makes it available for reading at the top of the schedule without a stall. (The delay slot of the conditional branch to the top of the loop might often be a good place for the autoincrement.)

2.5 Register Allocation

Once the loop scheduler 213 has found a schedule, the loop scheduler 213 allocates registers to the schedule. This section describes the manner in which the loop scheduler 213 performs register allocation.

Given a schedule, the register allocation technique employed by the present invention either succeeds or fails in finding a register allocation scheme for the schedule.

The inventor has discovered that the ordering of operations in the scheduling list can significantly effect the chances that register allocation will succeed. It has not been possible to locate a single heuristic for ordering the scheduling list that works well for all loops of interest. Thus, the loop scheduler 213 uses a small number of different heuristics. Each of these heuristics results in a different scheduling list for each loop that is being scheduled. The lists are considered in turn at each iteration interval. Whereas the best single heuristic has a success rate of approximately 70% of finding schedules at the minimum interaction interval, using multiple heuristics increases the success rate to over 90% (based on a sampling of approximately 200 loops gathered from various benchmarks).

For register allocation, when each operation is considered, a "legal range" of clocks is calculated, depending on the scheduled data predecessors and/or successors of the operation. If the operation has only scheduled successors the legal range starts with the latest clock schedule in which the operation can be scheduled and still satisfy the next operation instances of its successors. The schedule extends backward through a single II. If the operation has only scheduled predecessors, the legal range is ordered in the forward direction starting with the first clock in which all the operands are available and extends forward a single II.

The purpose of searching in either a forward or backward direction is to minimize the duration of time during which values require registers, in other words, to minimize live ranges. We are trying to keep operations that produce values close to the operations that read them. When we schedule the successors first and then try to schedule their operands as close as possible to them, we say we are "scheduling backward". When we schedule the predecessors first and then try to schedule their readers as close as possible to them, we say we are "scheduling forward".

The register allocation technique used according to the present invention combines both kinds of scheduling. For example, as already noted, some operations have particularly difficult resource requirements to satisfy. In this case, it is advantageous to try to schedule these operations first and then schedule both their readers and operands. For example, the floating point part of a calculation is scheduled before scheduling the loads that feed it and the stores of its results. Also, loops with many common subexpressions benefit from forward scheduling, whereas loops have better chances of register allocation when scheduled backward.

The heuristics which are used to perform register allocation according to a preferred embodiment of the present invention are presented below. Implementation of these heuristics will be apparent to persons skilled in the art.

1. Backward Depth first ordering with recurrences, with divide operations first and simple memory references last.

2. Increasing heights in the data precedence graphs, normalized for critical readers, with simple memory references last (this represents forward, breadth first scheduling).

3. Decreasing heights in the data precedence graphs, normalized for critical readers, with simple memory references last (this tends to schedule multiplies first, which may be advantageous for some target machines).

4. Simple backward depth first ordering influenced by CSEs (common subexpressions).

5. Increasing heights, normalized for critical readers, with memory references appearing at their true heights.

3. Architecture of the Loop Scheduler of the Present Invention

This section provides a detailed description of the control structure and components of the loop scheduler 213 according to a preferred embodiment of the present invention. The components of the loop scheduler 213 are presented primarily in terms of their functionality and interrelationship.

3.1 Overall Structure

The loop scheduler 213 is essentially a specialized optimizer and code generator. Its purpose is to exploit the parallelism between loop iterations thereby making effective use of the target machine's instruction level parallelism. A pseudo-code description of the overall structure of the loop scheduler 213 is shown in FIG. 9.

As evident in FIG. 9, it is within the charter of the loop scheduler 213 to fail to find a schedule. When this happens, conventional scheduling techniques are applied to the loop.

According to the present invention, the loop scheduler 213 discontinues the search for a software pipelined schedule under two conditions:

1. The size of the largest connected component exceeds a predetermined limit (this limit is implementation dependent). The next step, path length computation, is $O(n^3)$ in the number of operations in the largest strongly connected component. This expensive calculation is avoided when it cannot be afforded.

2. No schedule was found at any II below some predetermined limit (this limit is implementation dependent). One way of determining this limit is by first generating the non-software pipelined schedule and then using its length as this limit. Alternatively, this limit can be set heuristically, for example, as a percentage of the initial II or of the longest non-cyclical path through the DGP.

3.1.1 Enumerating the Schedules at a Given II

The pseudo-code in FIG. 9 includes the following statement: FOR EACH schedule FOUND AT ii. In this statement, "schedule" refers to the search heuristics described above. Given the possibility of a failure of register allocation, it is important to be able to find more than one schedule at a given II. After finding a schedule, the scheduler 213 resumes searching the space of possible schedules at a given II without checking redundant possibilities.

3.1.2 Ordering of Path Lengths Analysis and Code Transformations

It is useful to know minimum recurrence II for a number of the transformations that are being planned. In particular, unrolling and interleaving are sensitive to the MRII. Thus, the code transformation phase follows the calculation of paths lengths (which produces the MRII).

This ordering, however, suffers from a problem. At least one transformation that is implemented can significantly shorten the precedence cycles and thus potentially decrease the maximum component size below the threshold of affordability. This transformation is the reshaping of a computational expression via associativity, commutativity, and distributivity to remove nodes from the recurrence. For example, suppose the user wrote the following code:

DO . . .
a=b+c+a
END DO

Also assume that the front end chose to represent this code as:

t1=a+c
t2=b+t1

This presents a two operation recurrence. This code can be re-associated, however, as follows:

t1=b+c
a=a+t1

This presents a single operation recurrence. This transformation is not only good for code quality, but can in principle make the path length calculation feasible.

Conversely, these recurrence shortening transformations also benefit from the information derived from the path length calculation. This information yields the cost of the most expensive cycle that contains an operation and can thus be used to make decisions about which cycles to shorten. Granted, the transformations can be alternatively performed with more "ad hoc" information. But it is preferable to use real information when it is available.

According to the present invention, cycle shortening transformations are performed with ad hoc cycle length information only when the cost of deriving that data is prohibitive. If the transformations work with this ad hoc information, then an advantage is gained. If it does not work, then the search operation can be discontinued before a great deal of resources are expended.

3.2 Component Modules

Figure 10:
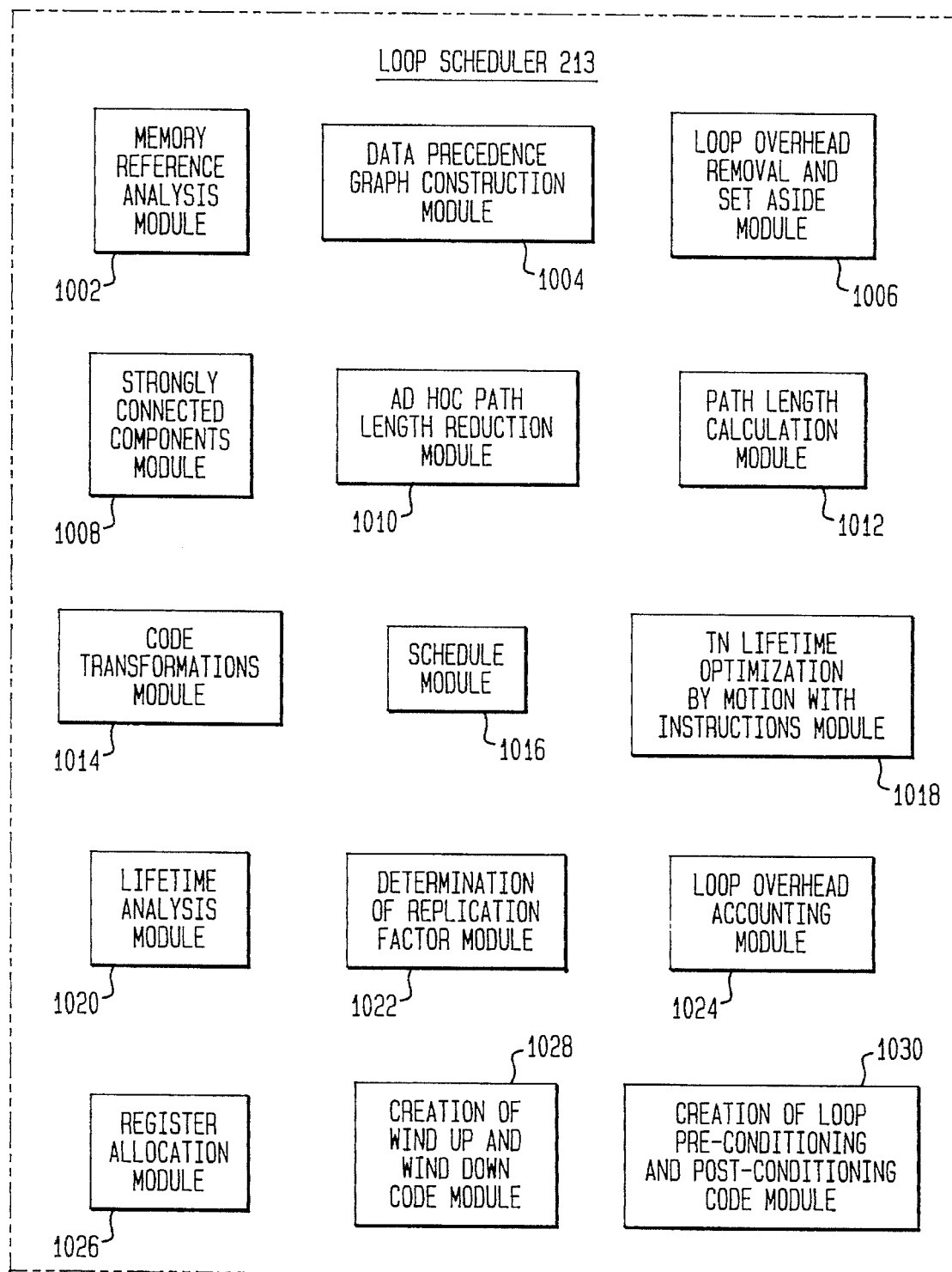
FIG. 10 is a block diagram of a loop scheduler according to a preferred embodiment of the present invention.

FIG. 10 is a block diagram of the loop scheduler 213. As shown in FIG. 10, the loop scheduler 213 includes a number of component modules. The functionality of the loop scheduler 213, as discussed above, is partitioned among these modules. These modules of the loop scheduler 213 are discussed in the following sections.

3.2.1 Memory Reference Analysis

The memory reference analysis module 1002 calculates the data precedence between memory references both within and beyond iterations. After memory reference analysis, it is possible to answer the question: are these two memory references ever to the same address? The answer consists of two parts:

1. A truth value: yes, no or maybe, and;
2. An iteration difference (when the true value is yes or maybe).

Depending on the truth value, the loop scheduler 213 uses this information in different ways. Suppose that O and P are two memory references. Then:

1. A no answer means:

$\forall i \forall j$ if O≠P or i≠j then Address (O{i})≠Address (P {k})

That is, no two executions of O and P access the same memory location. When the answer is no the iteration difference is meaningless.

2. A yes with iteration difference equal to k means:
 i. if O≠P then k≧0 else k>0,
 ii. $\forall i$ Address (O{i})=Address (P {i+k}), and
 iii. k is minimal.

That is, O references the same address as P,k loop trips apart and references closer than k loop trips apart are certainly to different addresses. With a yes answer it is possible to exploit both the identity of references as the iteration difference and the nonidentity of references separated by few trips than the iteration difference. Exploiting the identity may, for example, allow one of the two memory references to be eliminated. Exploiting the non-identity may allow executions of O to be moved relative to executions of P.

3. A result of maybe with iteration difference equal to k means:
if O≠P then:
 i. k≧0,
 ii. $\forall$(i, 0 ≦j<k) Address (O {i})≠Address (P{i+j}), and
 iii. k is maximal
else
k>0,
 ii. $\forall$(i, 0<j<k) Address (O{i}≠Address (P{i+j}), and
 iii. k is maximal That is, it is safe to assume that executions of O and P separated by fewer than k loop trips are to different memory addresses, but this assumption is not safe for differences of k and higher. The scheduler 213 is free to exploit the non-identity for iteration separations less than k, but must be conservative for values k and greater.

A simple example will make this clearer. Consider the following loop:

do i=1,n
 a(i)=a(i-1)+c
 p(i)=a(b(i))
end do

The three references to "a" are as follows:

1. the store: a(i)
2. the direct load: a(i-1), and
3. the indirect load: a(b(i)).

The answers to the memory reference question for all the combinations of the references to "a" are shown in the following table:

| O | a(i) | P<br>a(i-1) | a(b(i)) |
|---|---|---|---|
| a(i) | no | <yes,1> | <maybe, 0> |
| a(i-1) | no | no | <maybe, 0> |
| a(b(i)) | <maybe, 0> | <maybe, 0> | <maybe, 1> |

3.2.2 Data Precedence Graph Construction

The data precedence graph construction module 1004 builds a data precedence graph that includes dependences from within a given iteration and across iterations. The dependences serve two related purposes. They make explicit the transmission of scalar data from result to operand, and they prevent illegal re, ordering (for example, of memory references). Operand dependences imply an ordering of execution, but not all dependences imply explicit scalar transmission of dam. An edge in the graph may thus be either an operand edge or an ordering edge.

The DPG is really a multigraph; more than one edge may relate two operations. Operands are particularly good at causing this (as with x+x), but there might also be both operand and other dependence between two elements.

The edges in the DPG have costs (as described above).

3.2.3 Loop Overhead Removal and Set Aside

The loop overhead removal and set aside module 1006 generates the set of operations that are performed once per hardware loop iteration, no matter how many times the loop is replicated and/or unrolled. These operations include induction variable increments, and tests of induction variables. Before scheduling, the loop overhead removal and set aside module 1006 identifies these operations and sets them aside. After scheduling and schedule replication, the loop overhead removal and set aside module 1006 reinserts them.

3.2.4 Strongly Connected Components

The strongly connected components module 1008 partitions the DPG into equivalence classes of strongly connected components. A singleton strongly connected component may or may not be a self loop. It might also be an operation which is not a member of any cycle. This property can be flagged easily. At this point, the loop scheduler 213 will know if the DPG is acyclic, and will know the size of the largest strongly connected component.

3.2.5 Ad Hoc Path Length Reduction

The ad hoc path length reduction module 1010 operates with strongly connected components that exceed a predetermined, implementation dependent limit. For such strongly connected components, the ad hoc path length reduction module 1010 performs various heuristics to reduce the number of elements of recurrences and thus reduce the size of the connected components (this is described above). Although many types of heuristics may be used, one useful heuristic is as follows: for expressions that read and write the some TN, minimize the distance from the read to the write.

3.2.6 Path Length Calculation

The path length calculation module computes the closure of the path costs within each strongly connected component. Costs are represented as sets of edge costs of the form <iteration difference,delay >. These sets allow them to be independent of the iteration interval. A side effect of this algorithm is that it generates the MRII.

3.2.7 Code Transformations

The code transformations module 1014 performs code transformations that are specific to loop scheduling. Examples of such code transformations include (1) unrolling to fill the resources of the machine evenly; (2) maximizing the use of MADDs (multiply/add operations) where appropriate; (3) interleaving (also called "riffling") to increase the parallelism of reduction loops; (4) conversion of control dependences to data dependences; (5) minimization of the length of cycles (possibly via associativity); and (6) promotion/demotion of MADDs from/to multiplies and/or adds.

3.2.8 Schedule

The schedule module 1016 enumerates over schedules at a given II. The schedule module 1016 continues to look for schedules without replication when register allocation fails.

3.2.9 TN Lifetime Optimization by Motion within Instructions

The TN lifetime optimization by motion within instructions module 1018 optimizes lifetimes within instructions. Where possible, this module 1018 reduces the size of cliques by reordering operations within instructions. This module 1018 operates according to the following rules: (1) operations that kill more values than they write come first; (2) if a TN has one loop iteration instance read in the cycle and another iteration instance written in the same instruction, the read should precede the write (this will minimize the need to replicate the loop, as discussed below); and (3) size the number of reader-writer pairs that overlap.

3.2.10 Lifetime Analysis—Build the Interference Graph

The lifetime analysis module 1020 determines the lifetimes of TNs. A lifetime is a set of instructions during which a TN is assumed to be in a register. Two TNs have overlapping lifetimes when the intersection of their lifetimes is non-empty.

3.2.11 Determination of Replication Factor

The determination of replication factor module 1022 replicates the schedule so that no two loop iteration instances of the same TN have overlapping lifetimes. This is discussed in greater detail above.

3.2.12 Loop Overhead Accounting

The loop overhead accounting module 1024 accounts for the loop overhead that was set aside by the loop overhead removal and set aside module 1006. The loop overhead accounting module 1024 accounts for the loop overhead so that: (1) effective addresses are calculated accurately, and (2) induction variable increments and conditional loop exits are scheduled.

3.2.13 Register Allocation

The register allocation module 1026 allocates registers to the schedule once the schedule is created. The manner in which registers are allocated is discussed above.

3.2.14 Creation of Wind-up and Wind-down Code

The creation of wind-up and wind-down code module 1028 generates wind-up and wind-down code. The manner in which this module 1028 operates is discussed above.

3.2.15 Creation of Loop Pre-Conditioning and Post-Conditioning Code

The creation of loop pre-conditioning and post-conditioning code module 11030 sets up code such that the loop trip is an even multiple of the number of loop iterations started per schedule trip. This is discussed further above.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of generating a schedule for executing in a target computer loops of instructions contained in a computer program, comprising the steps of:

(1) searching for an optimal loop schedule for executing a particular instruction loop in the target computer;

(2) identifying loop overhead instructions and non-loop overhead instructions in said particular instruction loop;

(3) generating a replicated loop schedule by replicating said non-loop overhead instructions in said loop schedule by a replication factor such that overlap of each operation instance in said optimal loop schedule with itself is prevented;

(4) inserting said loop overhead instructions into said replicated loop schedule to generate a modified loop schedule; and (5) allocating registers of the target computer to said modified loop schedule.

2. The method of claim 1, wherein step (4) comprises the steps of:

using loop overhead information and an iteration number of a memory reference operation in said optimal loop schedule to calculate effective address information of said memory reference operation; and inserting said effective address information into said replicated loop schedule.

3. The method of claim 2, wherein step (4) further comprises the steps of:

generating first scheduling information pertaining to scheduling operations of said particular instruction loop which operate to increment induction variables;

generating second scheduling information pertaining to scheduling operations of said particular instruction loop which operate to exit conditional loops; and inserting said first and second scheduling information into said replicated loop schedule.

4. The method of claim 1, wherein step (1) comprises the steps of:

enumerating all possible schedules of said particular instruction loop using a predetermined exponential search procedure;

ordering said all possible schedules in a search list according to complexity of operation scheduling; and pruning said predetermined exponential search procedure to expedite back searching in said search list.

5. The method of claim 1, wherein step (2) comprises the steps of:

classifying an instruction of said particular instruction loop as a loop overhead instruction if said instruction operates to increment an induction variable; and classifying said instruction as a loop overhead instruction if said instruction operates to perform a logical test of an induction variable.

6. The method of claim 1, wherein step (3) comprises the steps of:

determining a total number of instructions value corresponding to the number of instructions in said particular instruction loop;

determining a lifetime of each operation instance in said optimal loop schedule;

generating a set of potential replication factors, each element of said set being equal to a lifetime value for an operation instance divided by said total number of instructions value; and setting said replication factor equal to a maximum value in said set.

7. The method of claim 1, wherein step (5) comprises the steps of:

calculating an applicable executable range of clock cycles for an operation instance of said modified loop schedule according to any scheduled data predecessors and any scheduled data successors of said operation instance;

performing a forward search of said modified loop schedule to schedule any unscheduled data predecessors of said operation instance; and performing a backward search of said modified loop schedule to schedule any unscheduled data successors of said operation instance.

8. A method of generating a schedule for executing in a target computer loops of instructions contained in a computer program, comprising the steps of:

(1) searching for an optimal loop schedule for executing a particular instruction loop in the target computer, said search including:

enumerating all possible schedules of said particular instruction loop using a predetermined exponential search procedure;

ordering said all possible schedules in a search list according to complexity of operation scheduling; and pruning said predetermined exponential search procedure to expedite back searching in said search list;

(2) identifying loop overhead instructions and non-loop overhead-instructions in said particular instruction loop, said identifying including:

classifying an instruction of said particular instruction loop as a loop overhead instruction if said instruction operates to increment an induction variable; and classifying said instruction as a loop overhead instruction if said instruction operates to perform a logical test of an induction variable;

(3) generating a replicated loop schedule by replicating said non-loop overhead instructions in said loop schedule by a replication factor such that overlap of each operation instance in said optimal loop schedule with itself is prevented, said generating including:

determining a total number of instructions value corresponding to the number of instructions in said particular instruction loop;

determining a lifetime of each operation instance in said optimal loop schedule;

generating a set of potential replication factors, each element of said set being equal to a lifetime value for an operation instance divided by said total number of instructions value; and setting said replication factor equal to a maximum value in said set;

(4) inserting said loop overhead instructions into said replicated loop schedule to generate a modified loop schedule, said inserting including:

using loop overhead information and an iteration number of a memory reference operation in said optimal loop schedule to calculate effective address information of said memory reference operation; and inserting said effective address information into said replicated loop schedule; and (5) allocating registers of the target computer to said modified loop schedule, said allocating including:

calculating an applicable executable range of clock cycles for an operation instance of said modified loop schedule according to any scheduled data predecessors and any schedules data successors of said operation instance;

performing a forward search of said modified loop schedule to schedule any unscheduled data predecessors of said operation instance; and performing a backward search of said modified loop schedule to schedule any unscheduled data successors of said operation instance.

9. A system for generating a schedule for executing in a target computer loops of instructions contained in a computer program, comprising:

optimal loop searching means for searching for an optimal loop schedule for executing a particular instruction loop in the target computer;

instruction identifying means for identifying loop overhead instructions and non-loop overhead instructions in said particular instruction loop;

replicating means for generating a replicated loop schedule by replicating said non-loop overhead instructions in said loop schedule by a replication factor such that overlap of each operation instance in said optimal loop schedule with itself is prevented;

loop overhead means for inserting said loop overhead instructions into said replicated loop schedule to generate a modified loop schedule; and register allocating means for allocating registers of the target computer to said modified loop schedule.

10. The system of claim 9, wherein said loop overhead means comprises:

means for using loop overhead information and an iteration number of a memory reference operation in said optimal loop schedule to calculate effective address information of said memory reference operation; and means for inserting said effective address information into said replicated loop schedule.

11. The system of claim 10, wherein said loop overhead means further comprises:

means for generating first scheduling information pertaining to scheduling operations of said particular instruction loop which operate to increment induction variables;

means for generating second scheduling information pertaining to scheduling operations of said particular instruction loop which operate to exit conditional loops; and means for inserting said first and second scheduling information into said replicated loop schedule.

12. The system of claim 9, wherein said optimal loop searching means comprises:

means for enumerating all possible schedules of said particular instruction loop using a predetermined exponential search procedure;

means for ordering said all possible schedules in a search list according to complexity of operation scheduling; and means for pruning said predetermined exponential search procedure to expedite back searching in said search list.

13. The system of claim 9, wherein said instruction identifying means comprises:

means for classifying an instruction of said particular instruction loop as a loop overhead instruction if said instruction operates to increment an induction variable; and means for classifying said instruction as a loop overhead instruction if said instruction operates to perform a logical test of an induction variable.

14. The system of claim 9, wherein said replicating means comprises:

means for determining a total number of instructions value corresponding to the number of instructions in said particular instruction loop;

means for determining a lifetime of each operation instance in said optimal loop schedule;

means for generating a set of potential replication factors, each element of said set being equal to a lifetime value for an operation instance divided by said total number of instructions value; and means for setting said replication factor equal to a maximum value in said set.

15. The system of claim 9, wherein said register allocating means comprises:

means for calculating an applicable executable range of clock cycles for an operation instance of said modified loop schedule according to any scheduled data predecessors and any scheduled data successors of said operation instance;

means for performing a forward search of said modified loop schedule to schedule any unscheduled data predecessors of said operation instance; and means for performing a backward search of said modified loop schedule to schedule any unscheduled data successors of said operation instance.

16. A system for generating a schedule for executing in a target computer loops of instructions contained in a computer program, comprising:

optimal loop searching means for searching for an optimal loop schedule for executing a particular instruction loop in the target computer, wherein said optimal loop searching means includes:

means for enumerating all possible schedules of said particular instruction loop using a predetermined exponential searching procedure;

means for ordering said all possible schedules in a search list according to complexity of operating scheduling; and means for pruning said predetermined exponential search procedure to expedite back searching in said search list;

instruction identifying means for identifying loop overhead instructions and non-loop overhead instructions in said particular instruction loop, wherein said instruction identifying means includes:

means for classifying an instruction of said particular instruction loop as a loop overhead instruction if said instruction operates to increment an induction variable; and means for classifying said instruction as a loop overhead instruction if said instruction operates to perform a logical test of an induction variable;

replicating means for generating a replicated loop schedule by replicating said non-loop overhead instructions in said loop schedule by a replication factor such that overlap of each operation instance in said optimal loop schedule with itself is prevented, wherein said replicating means includes:

means for determining a total number of instructions value corresponding to the number of instructions in said particular instruction loop;

means for determining a lifetime of each operation instance in said optimal loop schedule;

means for generating a set of potential replication factors, each element of said set being equal to a lifetime value for an operation instance divided by said total number of instructions value; and means for setting said replication factor equal to a maximum value in said set;

loop overhead means for inserting said loop overhead instructions into said replicated loop schedule to generate a modified loop schedule, wherein said loop overhead means includes:

means for using loop overhead information and an iteration number of a memory reference operation in said optimal loop schedule to calculate effective address information of said memory reference operation; and means for inserting said effective address information into said replicated loop schedule; and register allocating means for allocating registers of the target computer to said modified loop schedule, wherein said register allocating means comprises:

means for calculating an applicable executable range of clock cycles for an operation instance of said modified loop schedule according to any scheduled data predecessors and any scheduled data successors of said operation instance;

means for performing a forward search of said modified loop schedule to schedule any unscheduled data predecessors of said operation instance; and means for performing a backward search of said modified loop schedule to schedule any unscheduled data successors of said operation instance.

* * * * *